United States Patent [19]

Schenk et al.

[11] 4,049,883

[45] Sept. 20, 1977

[54] GAS- AND LIQUID-TIGHT STORAGE BATTERY

[75] Inventors: Gerd Schenk, Iserlohn; Heinz Haake, Breckerfeld, both of Germany

[73] Assignee: Varta Batterie Aktiengesellschaft, Hannover, Germany

[21] Appl. No.: 707,284

[22] Filed: July 21, 1976

[30] Foreign Application Priority Data

Sept. 24, 1975 Germany .............................. 2542459

[51] Int. Cl.² .......................................... H01M 10/34
[52] U.S. Cl. .................................... 429/94; 429/163; 429/178; 429/185; 29/623.1
[58] Field of Search ....................... 429/53, 57, 72, 82, 429/94, 163, 164, 170–172, 174, 178, 185; 29/623.1, 623.2

[56] References Cited

U.S. PATENT DOCUMENTS

| 3,156,585 | 11/1964 | Yamano et al. | 429/94 |
| 3,338,750 | 8/1967 | Urry | 429/53 |
| 3,503,806 | 3/1970 | Sugalski | 429/178 X |
| 3,939,011 | 2/1976 | Zaleski | 429/54 |

Primary Examiner—Anthony Skapars
Attorney, Agent, or Firm—Herbert L. Lerner

[57] ABSTRACT

A storage battery sealed gas-tightly and liquid-tightly in which an electrode set with a pole lead is inserted in a battery casing fully open at one end and closed at the other end except for a central opening through which the pole lead extends. Insulation prevents electrical contact between pole lead and casing. A bottom disk is welded on the full opening of the casing to make it electrolyte-tight and gas-tight. Electrolyte is introduced through the central opening and the opening then sealed. In the preferred system, the pole is a hollow terminal post connected to a contact disk attached to electrodes of one polarity of the electrode winding. The electrodes of other polarity are connected to a bottom disk which is welded on the full opening.

5 Claims, 1 Drawing Figure

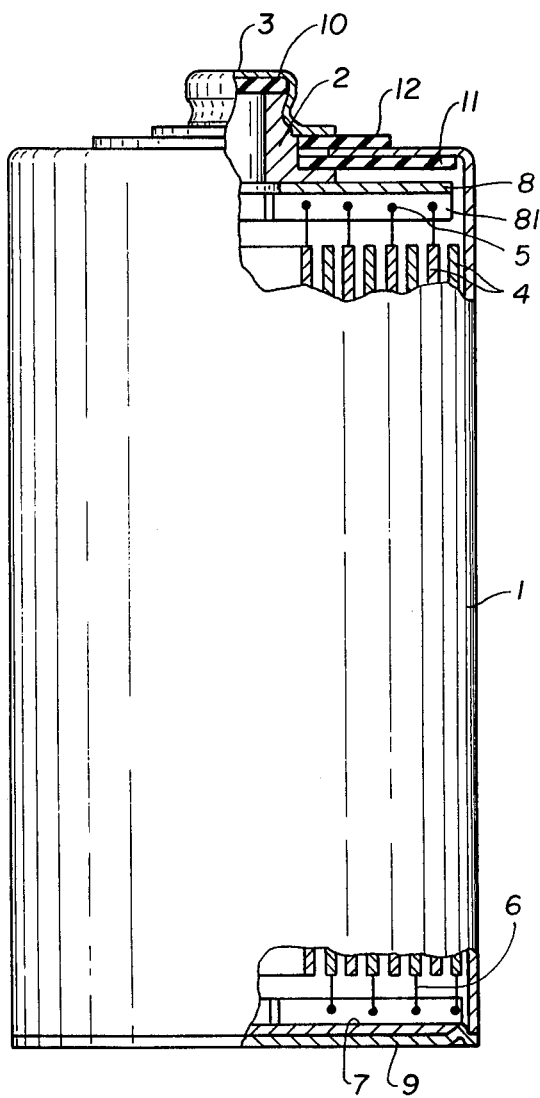

GAS- AND LIQUID-TIGHT STORAGE BATTERY

BACKGROUND OF THE INVENTION

1. Field of the Invention

This invention relates to a storage battery and more particularly refers to a new and improved storage battery, sealed gas- and liquid-tightly, with an electrode set enclosed in a casing, and method of producing it.

2. Description of the Prior Art

Alkaline storage batteries which are sealed gas- and liquid-tightly are known in varied designs. Popular among them are, in particular, circular cells, in which the electrode set is an electrode winding which is housed in a deep-drawn cup. The cup then forms one pole of the cell and it is sealed by a cover and a sealing- and insulating ring connected to the edge of the cup by a bead. The cover then forms the other pole of the cell. Joining the cover and the housing together in a gas- and liquid-tight manner presents special difficulties, as the alkaline electrolyte used penetrates even into the smallest gaps and crystallizes. This penetration is promoted by the overpressure in the cell, which is produced during charging and discharging.

Various procedures were tried in an effort to produce a seal which is as perfect as possible. Since bulging-out would frequently occur through pressing alone, resort was had to the expensive and time consuming step of calibrating the entire cell once more after the cover and the seal are beaded over. Unfortunately, because of the strong tendency of the alkaline electrolyte to leak, the recalibrated cells did not always achieve a perfect seal.

SUMMARY OF THE INVENTION

It is therefore an object of the invention to provide a gas-and liquid-tight storage battery which can be manufactured efficiently and economically and with which reliable sealing is ensured for extended period of operation.

With the foregoing and other objects in view, there is provided in accordance with the invention storage battery sealed gas-tightly and liquid-tightly including a battery casing closed at one end except for an opening in the closed end, an electrode set disposed in the battery casing with a pole lead of the electrode set extending through the opening, insulation disposed between the casing end having the opening and the pole lead to prevent passage of electric current therebetween, and sealing means to make the opening electrolyte-tight and prevent leakage of electrolyte therethrough, and a welded-on bottom disk on the opposite full opening of the battery casing to electrolyte-tightly and gas-tightly seal the opposite end of the battery casing.

In a preferred embodiment the electrode set is an electrode winding with an electrode of one polarity connected to a contact disk attached to a hollow terminal post, and the electrode of the other polarity of the electrode winding is connected to a bottom disk. Pressure release means such as a pressure relief valve or burst diaphragm, i.e. a diaphragm which will burst when subjected to a predetermined pressure, may be inserted in the hollow terminal post for the release of gas from the storage battery. Desirably, the electrodes of one polarity are displaced in height relative to the electrodes of other polarity with each contact disk connected to electrodes of one polarity spaced from the electrodes of other polarity.

In accordance with the invention, method of producing a storage battery sealed gas-tightly and liquid-tightly which includes forming a battery casing having a full opening at one end and closed at the opposite end except for an opening in the closed end, inserting through the full opening of the battery casing an electrode set having a hollow terminal post and having an insulating washer around the post, to bring the post through the opening and insulate the post from the metal wall forming the opening, welding a bottom disk to the battery casing at the full opening to provide an electrolyte-tight and gas-tight closure, injecting electrolyte through the hollow terminal post into the battery casing, inserting pressure release means in the hollow terminal post, placing a sealing washer around the outside diameter of the hollow terminal post with the flat surface of the washer resting on the metal wall forming the opening and snugly fitted around the terminal post, and pressing a terminal post cap onto the terminal post to secure the pressure release means and the sealing washer.

DESCRIPTION OF THE DRAWING

Other features which are considered as characteristic for the invention are set forth in the appended claims.

Although the invention is illustrated and described herein as embodied in gas- and liquid-tight storage battery, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing, which diagrammatically illustrates in partial section an elevational view of the storage battery of the present invention.

DETAILED DESCRIPTION OF THE INVENTION

In accordance with the invention, the housing or casing is cup-shaped and at least one pole lead of the electrode packet arranged in the housing is brought through an opening in the bottom of the housing cup, which is matched to the diameter of the pole lead and sealed in an electrolyte-tight and insulated manner, and the opposite, full opening of the housing cup is sealed electrolyte- and gas-tightly by a welded-on bottom disk.

Referring to the drawing, the housing cup 1 is a metallic casing or can formed of one piece of metal with one end of the can fully open and the other end of the can closed except for a central opening. Disposed in the can is an electrode assembly which consists of superposed electrode plates of opposite polarity held separated by a porous or microporous electrically-insulating separator sheet or layer with the alkaline electrolyte held absorbed or immobilized in the pores of the separator sheet and plates. More specifically, as shown in the drawing, an electrode winding 4, consisting as customary of positive and negative electrodes wound up to form a winding with the interposition of separators, is disposed in housing cup 1. The two electrodes of electrode winding 4 are desirably displaced here in height with the edge 5 of the electrode of one polarity extending above the electrode 6 of opposite polarity and similarly the edge 6 at the bottom of electrode winding 4 extends below electrode 5. Edge 5 is connected to a contact disk 8. This contact disk, which is undetachably connected to the edge of the corresponding electrode, advantageously by welding, may have different forms. A particularly useful form of contact disk is one in which, for example, several radially extending cutouts with raised edges 81 engage with the edge of the electrode. Disposed on contact disk 8 is a welded-on or spotted-on terminal post 2. This, in accordance with the invention, is brought through the central opening in the housing cup 1. The central opening is matched to the diameter of the terminal post 2, i.e. the diameter of the central opening is close to but sufficiently greater than the diameter of post 2 to avoid electrical contact between them. The gap between them will vary with the size of the battery but oridinarily a gap of 2 to 10 mm will be adequate. The central opening in the housing cup 1 has a substantially smaller diameter than the housing cup 1, with the ratio of diameters frequently bring 1:4 but may vary from 1:8 to 1:2. The terminal post 2 itself is a hollow body, which may, for example, contain a burst diaphragm 10 or another conventional valve safety device.

The electrode 6 of opposite polarity, which protrudes at the opposite end of the electrode winding 4, likewise has a contact disk 7, which is designed like the contact disk 8. A bottom disk 9 is undetachably attached to this contact disk 7 by electric welding. The contact disk 7 and the bottom cover 9 may be replaced by a single part which serves to function as a contact disk and bottom cover. The bottom disk 7 and therefore, the housing of the storage battery to which it is welded, are in general connected to the negative electrode of electrode winding 4. However, if desired, the polarity of the casing 1 may be made positive by connecting bottom disk 7 to the positive electrode of electrode winding 4.

After placing an insulating washer 11 on the electrode winding 4, it is inserted into the cell housing 1, so that the terminal post 2 is brought through the central opening of the housing cup 1. Thereafter, the bottom disk 9 is welded to the edge of the housing cup 1 to provide electrolyte- and gas-tight seal. A so-called ultra-pulse welding process, which makes possible extremely short welding times in the range of milliseconds, is particularly well adapted to effect this welding. The welding energy is obtained within a very short time from a capacitor or a capacitor battery, which has the function of an energy storage device. In the welding process, the capacitor is discharged via a pulse transformer, in the secondary circuit of which the material to be welded is arranged. With such a method, a perfect liquid-tight and gas-tight weld of the edge of the housing cup and the bottom disk can be readily achieved.

After the bottom disk 9 is welded on, the required amount of electrolyte is injected through the hollow terminal post 2. Then, the burst diaphragm 10 or other suitable conventional pressure relief valve can be mounted in the hollow terminal post 2. An outer sealing washer 12 is placed on the terminal post 2. This sealing washer 12 hugs the outside diameter of the terminal post 2 tight so as to snugly fit around post 2, and rests wide and flat on the end face of the cup 1. Thereupon, a conventional terminal post cap 3 can be pressed-on by means of a radial-pressure tool and the outer sealing washer 12 and the valve 10 secured thereby. Thus, a perfectly sealed, a gas-tight circular cell is produced by simple process steps, which can also be readily automated. A particular advantage of this cell is that the seal is subjected to axial pressure. A further advantage is that the weld between the bottom disk 9 and the housing cup 1 can be checked immediately after the assembly, which increases the relibility of the assembly substantially.

Construction and method of manufacturing in accordance with the present invention may also be applied to storage cell designs other than circular cells, as for example, other shapes such as oval or rectangular shapes. Storage batteries with rectangular sets of electrodes, for example, in rectangular housings can be produced without difficulty in this manner. In this case, a rectangular housing cup is used with one end provided with openings for the terminal posts of the different polarities, through which the respective terminal posts are brought in an electrolyte-tight and insulated manner, and the housing is then again sealed by welding-on a bottom plate in a gas- and liquid-tight manner.

There are claimed:

1. A storage battery sealed gas-tightly and liquid tightly comprising a battery casing closed at one end except for an opening in the closed end, an electrode set as an electrode winding disposed in said battery casing with a terminal post as a pole lead of said electrode set extending through said pole opening, an insulating washer around said pole lead disposed between the interior side of said casing end having the opening and said pole lead to prevent passage of electric current therebetween, an outer sealing washer snugly fitted around said terminal post with the flat surface of said washer resting on the metal wall forming said opening and a terminal post cap placed on said terminal post with said cap pressing against and holding said washer in place as sealing means to make said opening electrolyte-tight and prevent leakage of electrolyte therethrough, a contact disk connected to electrodes of one polarity of said electrode winding with said contact disk attached to said terminal post, and a welded-on bottom disk connected to electrodes of the other polarity of said electrode winding, on the opposite full opening of said battery casing to electrolyte-tightly and gas-tightly seal said opposite end of the battery casing.

2. Storage battery sealed gas- and liquid-tightly, according to claim 1, wherein said terminal post is hollow and contains a pressure release means for the release of gas from the storage battery.

3. Storage battery sealed gas-tightly and liquid-tightly, according to claim 1, wherein said electrodes of one polarity are displaced in height relative to the electrodes of other polarity with each contact disk connected to electrodes of one polarity spaced from the electrodes of other polarity.

4. A method of producing a storage battery sealed gas-tightly and liquid-tightly which comprises forming a battery casing having a full opening at one end and closed at the opposite end except for an opening in the closed end, inserting through said full opening of said battery casing an electrode set having a hollow terminal post and having an insulating washer around said post, to bring the post through said opening and insulate said post from the metal wall forming the opening, welding a bottom disk to the battery casing at the full opening to provide an electrolyte-tight and gas-tight closure, injecting electrolyte through said hollow terminal post into said battery casing, inserting pressure release means in said hollow terminal post, placing a sealing washer around the outside diameter of the hollow terminal post with the flat surface of said washer resting on said metal wall forming the opening and snugly fitted around the terminal post, and pressing a terminal post cap onto said terminal post to secure said pressure release means and said sealing washer.

5. A method of producing a storage battery sealed gas-tightly and liquid-tightly, according to claim 4, wherein said electrode set is an electrode winding, and wherein, prior to insertion of said electrode set into said battery casing, a contact disk is connected to electrodes of one polarity of said electrode winding, and wherein said hollow terminal post is attached to said contact disk, and wherein said electrodes of other polarity of said electrode winding is connected to a bottom disk which is welded to the edge of said full opening of said battery housing to form an electrolyte-tight and gas-tight closure.

* * * * *